Patented Apr. 19, 1949

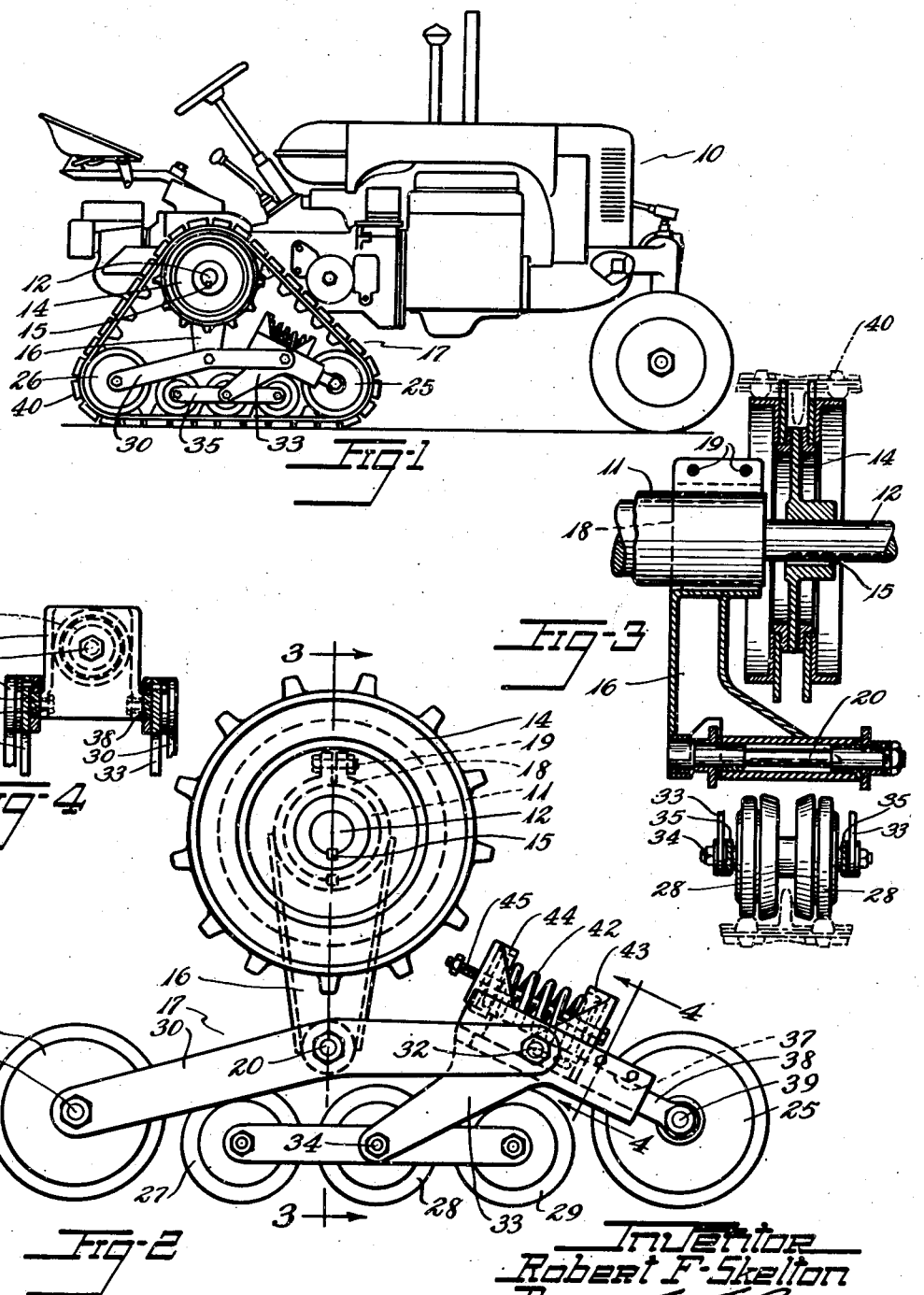

2,467,947

UNITED STATES PATENT OFFICE 2,467,947

TRACTION APPARATUS

Robert F. Skelton, Akron, Ohio, assignor to The B. F. Goodrich Company, New York, N. Y., a corporation of New York Application May 22, 1945, Serial No. 595,122

5 Claims. (Cl. 305—9)

This invention relates to traction apparatus for vehicles and is especially useful in providing for the replacement of the traction wheels of agricultural tractors, although the invention is also useful in the construction of tractor vehicles originally equipped with self-laying tracks.

Agricultural tractors are usually provided with a pair of traction wheels mounted for rotation about the rear axle of the tractor. It has been heretofore proposed to provide such tractors with replacement traction apparatus having self-laying tracks each trained about an undercarriage pivotally mounted about the ends of the rear axle. Such devices while providing improved flotation over soft ground have been of unstable construction in that resistance to overturning of the undercarriage relatively to the vehicle chassis, has been low, and under heavy pull the tendency of the support arms and bogies to rotate about the axle has limited the use of the tractor to light hauling.

Objects of the present invention are to overcome the foregoing and other difficulties, to provide a stable arrangement of parts, to provide high resistance to overturning, to provide apparatus capable of withstanding heavy pull, to provide adequate tensioning of the track, to provide resistance to shock loads, to prevent track breakage, and to provide simplicity of attachment.

These and other objects will appear from the following description and the accompanying drawings.

Of the drawings,

Fig. 1 is a side elevation of an agricultural tractor equipped with traction apparatus constructed in accordance with and embodying the invention.

Fig. 2 is a detail side view of the undercarriage and drive sprocket of Fig. 1.

Fig. 3 is a cross sectional view thereof, taken on line 3—3 of Fig. 2, the track being shown in dot-and-dash lines.

Fig. 4 is a cross-sectional view thereof, taken on line 4—4 of Fig. 2.

Referring to the drawings, the numeral 10 designates an agricultural tractor having an axle housing 11 through which a pair of axles such as 12 extend for driving the traction wheels. These wheels have been replaced by the apparatus of the invention, the illustrative embodiment of which may be described as follows: Each traction wheel is replaced by a driving wheel or sprocket 14 secured to its axle shaft 12 as by a key 15. A bracket 16 for supporting the tractor from an undercarriage 17, when such bracket is not formed integral with the axle housing, has means such as an axially split collar portion 18 adapted to fit over the end 11 of the axle housing to secure it to the housing. Bolts 19 are provided at the split portion to clamp the bracket to the axle housing. The brackets extend downwardly from the axle housing and are provided at their lower extensions with bearings for rotatably journaling shaft members 20 arranged parallel to the axles. Each undercarriage 17 is fixed to a shaft 20 for pivotal movement at a position close to the ground level and considerably below the axis of the axle housing.

The undercarriage includes a front guide wheel 25, a rear guide wheel 26 and intermediate bogie wheels 27, 28, and 29 together with means for dividing the load of the tractor to such wheels. For this purpose an equalizer frame 30 has one end pivotally supported by the axle 31 of wheel 26, and the opposite end pivotally secured as at 32 to a yoke 33. Yoke 33 has one end pivotally secured as at 34 to an equalizer 35 along which wheels 27, 28 and 29 are pivotally secured and spaced for load distribution. The opposite end of yoke 33 is formed with a guideway 37 in which an arm 38 is slideably mounted. Guide wheel 25 is pivotally mounted at 39 on arm 38.

The track 40 is trained about the drive wheel 14 and guide wheels 25 and 26 as shown in Fig. 1. Provision is made for tensioning the track and to provide for absorbing shock loads. To this end, a compression coil spring 42 is mounted between an abutment 43 on arm 38 and an abutment 44 on equalizer 33. A bolt 45 extending through the abutments may be used to compress the spring for the purpose of changing the track and is normally adjusted so as not to restrain the spring in its action. This arrangement provides for absorbing shock loads and prevents breaking of the tracks.

Provision is made for increasing resistance of the undercarriage to such deflections as would permit overturning of the tractor or disadvantageous raising of the rear guide wheel 26 by rotation of the undercarriage about shaft member 20 under heavy draw bar pull. To this end, the pivot point at shaft member 20 of the undercarriage is located between the level of the guide wheel centers 31, 39 and the level of the axle 12, and preferably at a position such that the sum of the turning moments about the pivot center of shaft member 20 acting against the undercarriage is zero or substantially so. The pivot point is also preferably arranged directly under the center of the axle 12 to provide direct support from the pivot point at shaft 20 to the axle housing when the tractor is on level ground and thereby to avoid excess torsional or bending stress of the bracket 16. The center of the guide wheel 25 is located farther from the pivot point at shaft 20 than is the center of the guide wheel 26 so as to provide greater ground contact area ahead of the pivot point than to the rear thereof. This lightens the load on the front end of the undercarriage permitting the bogies to surmount obstacles more easily. Also, in soft ground, the front bogie does not tend to dig in.

The apparatus may readily be formed separately as a unit and applied to a wheeled tractor by removing the drive wheels, clamping the bracket 16 to the axle housing, and replacing the wheels with sprockets 14. The driving gears between the track driving wheels and the engine may also be changed to provide a higher gear ratio made desirable by the small size of the sprockets as compared to the size of the original wheels.

Variations may be made without departing from the scope of the invention as it is defined by the following claims.

I claim:

1. A vehicle having a nonrotatable housing, a drive shaft rotatably mounted therein, a drive wheel fixed to said drive shaft, an undercarriage pivotally secured to said housing at a position below the center of said drive shaft for free pivotal movement, guide wheels rotatably mounted forwardly and rearwardly respectively of said shaft on said undercarriage below its pivoted center with the forward wheel spaced further from said center than the rearward wheel, a self-laying track surrounding said wheels for cooperation therewith, and equalizer means on said undercarriage to distribute the load to said wheels.

2. A vehicle having a nonrotatable housing, a drive shaft rotatably mounted therein, a drive wheel fixed to said drive shaft, an undercarriage pivotally secured to said housing at a position below the center of said drive shaft for free pivotal movement, guide wheels rotatably mounted forwardly and rearwardly respectively of said shaft on said undercarriage below its pivotal center with the forward wheel spaced further from said center than the rearward wheel, and a self-laying track surrounding said wheels for cooperation therewith, said pivotal center being located at a position where the sum of the forces acting to rotate said undercarriage about said center are substantially zero, and equalizer means on said undercarriage to distribute the load to said wheels.

3. Traction apparatus for a vehicle having a nonrotatable axle housing and a rotatable axle therein, said apparatus comprising a bracket adapted for attachment to said axle housing, an undercarriage having guide wheels rotatably mounted thereon for engaging an endless track, a driving wheel adapted for attachment to the axle for driving said track, said undercarriage being pivotally attached to said bracket at a position between said guide wheels but nearer to the rear wheel than the front wheel of said wheels where the sum of the forces acting to rotate said undercarriage about its pivotal attachment are substantially zero said undercarriage being free to move pivotally with respect to said bracket about its pivoted connection, and equalizer means on said undercarriage for distributing the load to said guide wheels.

4. Traction apparatus for a vehicle having a nonrotatable axle housing and a rotatable axle therein, said apparatus comprising a bracket adapted for attachment to said axle housing, an undercarriage having guide wheels rotatably mounted thereon for engaging an endless track, and a driving wheel adapted for attachment to the axle for driving said track, said undercarriage being pivotally attached to said bracket at a position between said guide wheels but nearer to the rear wheel than the front wheel of said wheels below the center of the axle rearwardly of the center of contact of the track with the ground and above the centers of the guide wheels and being mounted on said vehicle for free pivoted movement about its pivotal connection to said bracket, equalizer means on said undercarriage for distributing the load to said wheels, and resilient tensioning means on said equalizer means for tensioning said track.

5. Traction apparatus for a vehicle having a nonrotatable axle housing and a rotatable axle therein, said apparatus comprising a bracket adapted for attachment to said axle housing, an undercarriage having guide wheels rotatably mounted thereon for engaging an endless track, and a driving wheel adapted for attachment to the axle for driving said track, said undercarriage being pivotally attached to said bracket at a position between said guide wheels but nearer to the rear wheel than the front wheel of said wheels below the center of the axle rearwardly of the center of contact of the track with the ground and where the sum of the forces acting to rotate said under-carriage about its pivotal attachment are substantially zero, and being mounted on said vehicle for free pivotal movement about its pivoted connection to said bracket, equalizer means on said undercarriage for distributing the load to said wheels, and resilient tensioning means on said equalizer means for tensioning said track.

ROBERT F. SKELTON.

REFERENCES CITED

The following references are of record in the file of this patent:

UNITED STATES PATENTS

| Number | Name | Date |
|---|---|---|
| 1,330,253 | Fuller | Feb. 10, 1920 |
| 1,512,152 | White | Oct. 21, 1924 |
| 1,808,735 | Henneuse et al. | June 2, 1931 |
| 1,980,276 | Kegresse | Nov. 13, 1934 |
| 2,041,599 | Fergusson | May 19, 1936 |